United States Patent
Ando et al.

(10) Patent No.: US 8,404,126 B2
(45) Date of Patent: Mar. 26, 2013

(54) MANUFACTURING PROCESS OF ELECTRODE

(75) Inventors: Nobuo Ando, Tokyo (JP); Mitsuru Nagai, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 385 days.

(21) Appl. No.: 12/408,865

(22) Filed: Mar. 23, 2009

(65) Prior Publication Data

US 2009/0242507 A1 Oct. 1, 2009

(30) Foreign Application Priority Data

Mar. 26, 2008 (JP) ................................. 2008-081413

(51) Int. Cl.
- *H01B 13/00* (2006.01)
- *H01G 9/00* (2006.01)
- *B01J 13/00* (2006.01)

(52) U.S. Cl. ............................ 216/13; 361/523; 361/526

(58) Field of Classification Search ...................... 216/13
See application file for complete search history.

(56) References Cited

U.S. PATENT DOCUMENTS

| | | | |
|---|---|---|---|
| 5,658,691 A * | 8/1997 | Suzuki et al. | 429/231.8 |
| 6,461,769 B1 | 10/2002 | Ando et al. | |
| 6,921,609 B2 * | 7/2005 | Lampe-Onnerud et al. | 429/223 |
| 2004/0264110 A1 * | 12/2004 | Michel et al. | 361/508 |
| 2007/0002523 A1 * | 1/2007 | Ando et al. | 361/503 |

FOREIGN PATENT DOCUMENTS

| JP | 3485935 B2 | 10/2003 |
|---|---|---|
| JP | 2007-141897 A | 6/2007 |

* cited by examiner

*Primary Examiner* — Binh X Tran
*Assistant Examiner* — Thomas Pham
(74) *Attorney, Agent, or Firm* — McDermott Will & Emery LLP

(57) ABSTRACT

A resist layer is formed over one surface of a current-collector material, while a resist layer having a predetermined pattern is formed on the other surface of the current-collector material. Through-holes are formed on the current-collector material through an etching process. An electrode slurry is applied onto the current-collector material formed with the through-holes without removing the resist layers. Specifically, since the through-holes are closed by the resist layer, the electrode slurry does not pass through the through-holes to leak out. Therefore, the current-collector material can be conveyed in the horizontal direction, whereby the productivity of an electrode can be enhanced. The resist layers are made of PVdF, and the resist layers are removed in a heating and drying step in which the PVdF is dissolved.

2 Claims, 7 Drawing Sheets

(A) Whole-surface application step (B) Pattern application step (C) Etching step (A) First slurry application step (B) Second slurry application step (C) Heating and drying step 30: Current-collector material
31, 32: Resist layers (Protection layers)
20a, 23a: Through-holes

MANUFACTURING PROCESS OF ELECTRODE

CROSS-REFERENCE TO RELATED APPLICATIONS

The present application claims priority under 35 U.S.C. §119 to Japanese Patent Application No. 2008-081413, filed on Mar. 26, 2008, and which is hereby incorporated by reference herein it its entirety.

BACKGROUND OF THE INVENTION

1. Field of the Invention

The present invention relates to a manufacturing process of an electrode having a perforated current collector.

2. Description of the Related Arts

An electric storage device, such as a lithium ion battery or a lithium ion capacitor, is mounted on an electric vehicle or hybrid vehicle. When an electrode incorporated into an electric storage device is produced, an electrode slurry containing an active material is applied on a material of a current collector such as a metal foil. In general, the material of the current collector is conveyed in the horizontal direction so as to allow the material to pass through a drying furnace, whereby the electrode slurry is dried to form an electrode mixture layer.

An electric storage device has been proposed in which a metal lithium foil and a negative electrode are electrochemically in contact with each other in order to enhance an energy density of the electric storage device. In the electric storage device described above, lithium ions can be doped beforehand into the negative electrode. Thus, the potential of the negative electrode can be lowered, and the capacitance of the negative electrode can be increased. Therefore, the energy density of the electric storage device can be enhanced. Through-holes, through which the lithium ions pass, are formed on the current collector of each electrode in order to uniformly dope the lithium ions into the laminated plural negative electrodes (see JP-3485935).

When the electrode slurry is applied onto the current-collector material having the through-holes formed thereon, the electrode slurry might pass through the through-holes to reach the backside of the current-collector material. If the electrode slurry passes through the through-holes to reach the backside of the current-collector material, the electrode slurry might be deposited onto a guide roller that supports the current-collector material. In view of this, a manufacturing process has been proposed in which the current-collector material is lifted up in the vertical direction so as to apply the electrode slurry thereon. According to this manufacturing process, a guide roller is unnecessary during the process of lifting up the current-collector material, so that the deposition of the electrode slurry onto the guide roller can be prevented. Further, there has been proposed an electric storage device in which smaller through-holes are formed on the current-collector material in order to prevent the electrode slurry from passing through the through-holes to reach the backside of the current-collector material (see, for example, JP-A-2007-141897).

However, lifting up the current-collector material in the vertical direction entails the lowering of the conveying speed, which unfavorably lowers productivity of the electrode. Specifically, it is necessary to lift up the current-collector material in the vertical direction until the electrode slurry applied onto the current-collector material is dried. However, the current-collector material might be broken by its own weight, so that the limitation is imposed on the lifting height of the current-collector material. With the limitation on the lifting height, the limitation is also imposed on the height of the drying furnace used for drying the electrode slurry. It is necessary to decrease the conveying speed of the current-collector material in order to dry the electrode slurry with such a short drying furnace. As described above, lifting up the current-collector material in the vertical direction lowers the productivity of the electrode as well as increases the manufacturing cost.

When the through-holes are made small in order to prevent the electrode slurry from passing through the through-holes to reach the backside of the current-collector material, the electrode slurry can be applied while conveying the current-collector material in the horizontal direction. However, since the strength of the current-collector material provided with the through-holes is lower than the strength of the current-collector material having no through-holes formed thereon, the conveying speed of the current collector provided with the through-holes tends to lower. Even if the horizontal conveyance is made possible by the formation of the through-holes having smaller diameter, it is difficult to enhance productivity of the electrode compared to the case of the current-collector material having no through-holes formed thereon. Moreover, since the through-holes of the current collector are smaller, the moving speed of the lithium ions is lowered when the lithium ions are doped into the negative electrode. The lowering of the moving speed causes a long-term doping operation of the lithium ions into the negative electrode. The long-term doping operation deteriorates productivity of the electric storage device as well as increases manufacturing cost thereof.

There are a mechanical process such as pressing and a chemical process such as etching as a method for forming through-holes on the current-collector material. In terms of quality, the current-collector material is preferably subject to etching. However, when the current-collector material is subject to etching, a resist layer having a predetermined pattern has to be formed on the current-collector material. After the through-holes are formed by the etching, the resist layer has to be removed from the current-collector material. In this manner, many processes are required to perform the etching, which lowers productivity of the current collector as well as lowers productivity of the electrode.

SUMMARY OF THE INVENTION

The present invention aims to enhance productivity of an electrode provided with a perforated current collector.

A manufacturing process of an electrode according to the present invention is a manufacturing process of an electrode provided with a perforated current collector, the manufacturing process including a protection layer formation step in which a protection layer spreading on one surface of a current-collector material is formed while a protection layer having a predetermined pattern is formed on the other surface of the current-collector material; an etching step for performing an etching process on the current-collector material from the surface on which the protection layers having the predetermined pattern is formed so as to form through-holes on the current-collector material; a mixture layer formation step in which an electrode slurry is applied onto the current-collector material having the protection layers and the through-holes so as to form an electrode mixture layer; and a protection layer removing step for removing the protection layers from the current-collector material having the electrode mixture layer.

In the manufacturing process of an electrode according to the present invention, the protection layers are removed by a heat treatment in the protection layer removing step.

In the manufacturing process of an electrode according to the present invention, the protection layers are absorbed into the electrode mixture layer in the protection layer removing step.

In the manufacturing process of an electrode according to the present invention, a material that is the same as a binder contained in the electrode mixture layer is used for the protection layers.

In the manufacturing process of an electrode according to the present invention, the protection layers contain polyvinylidene fluoride.

In the present invention, the electrode slurry is applied onto the current-collector material having the protection layer. This structure prevents the applied electrode slurry from leaking from the through-holes. Therefore, the current-collector material having the electrode slurry applied thereon can be conveyed in the horizontal direction, whereby productivity of the electrode can be enhanced.

DETAILED DESCRIPTION OF THE PREFERRED EMBODIMENTS

Figure 1:
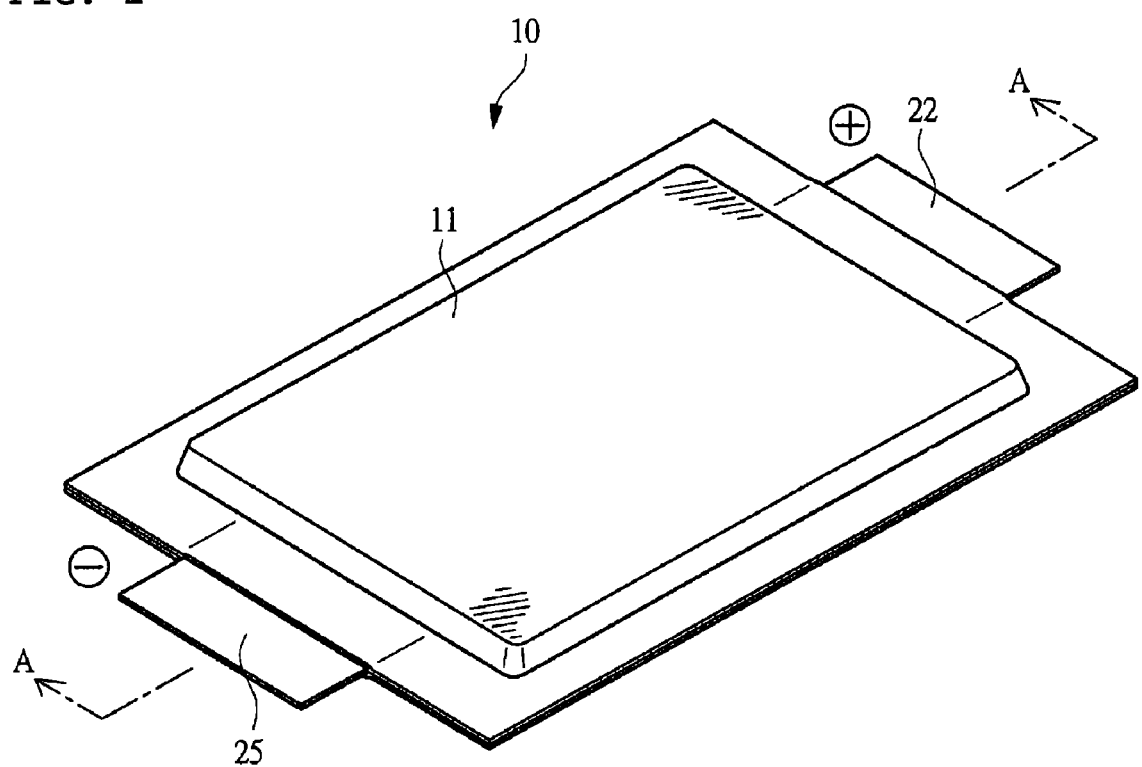
FIG. 1 is a perspective view showing an electric storage device.
Figure 2:
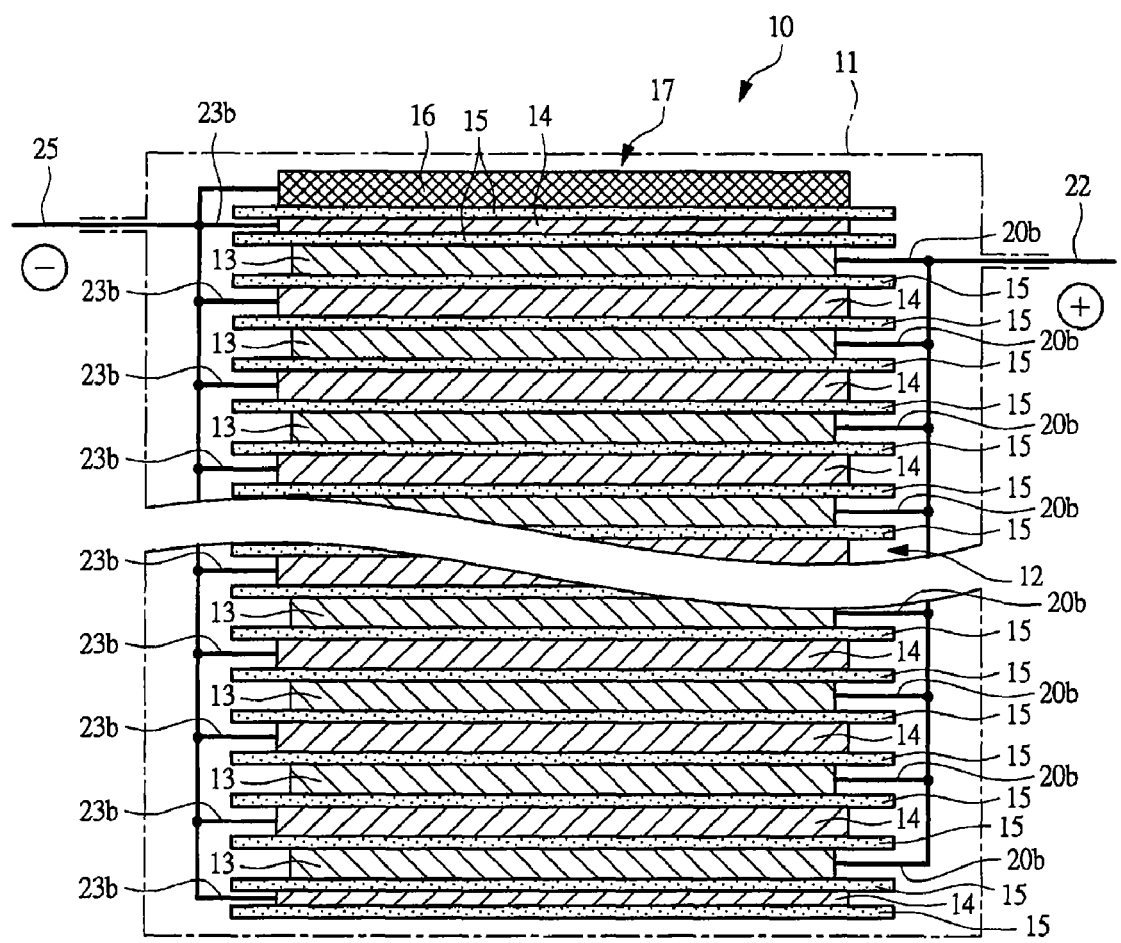
FIG. 2 is a sectional view schematically showing an internal structure of the electric storage device along A-A line in FIG. 1.

FIG. 1 is a perspective view showing an electric storage device 10 according to one embodiment of the present invention. FIG. 2 is a sectional view schematically showing an internal structure of the electric storage device 10 taken along a line A-A in FIG. 1. As shown in FIGS. 1 and 2, an electrode laminate unit 12 is accommodated in a laminate film 11 serving as an outer casing of the electric storage device 10. The electrode laminate unit 12 is composed of positive electrodes 13 and negative electrodes 14 that are laminated alternately. A separator 15 is interposed between each of the positive electrodes 13 and each of the negative electrodes 14. A lithium electrode 16 is arranged at the outermost part of the electrode laminate unit 12 so as to be opposite to the negative electrode 14. The separator 15 is provided between the negative electrode 14 and the lithium electrode 16. The electrode laminate unit 12 and the lithium electrode 16 constitute a three-electrode laminate unit 17. An electrolyte solution is injected into the laminate film 11. The electrolyte solution is made of aprotic organic solvent containing lithium salt.

Figure 3:
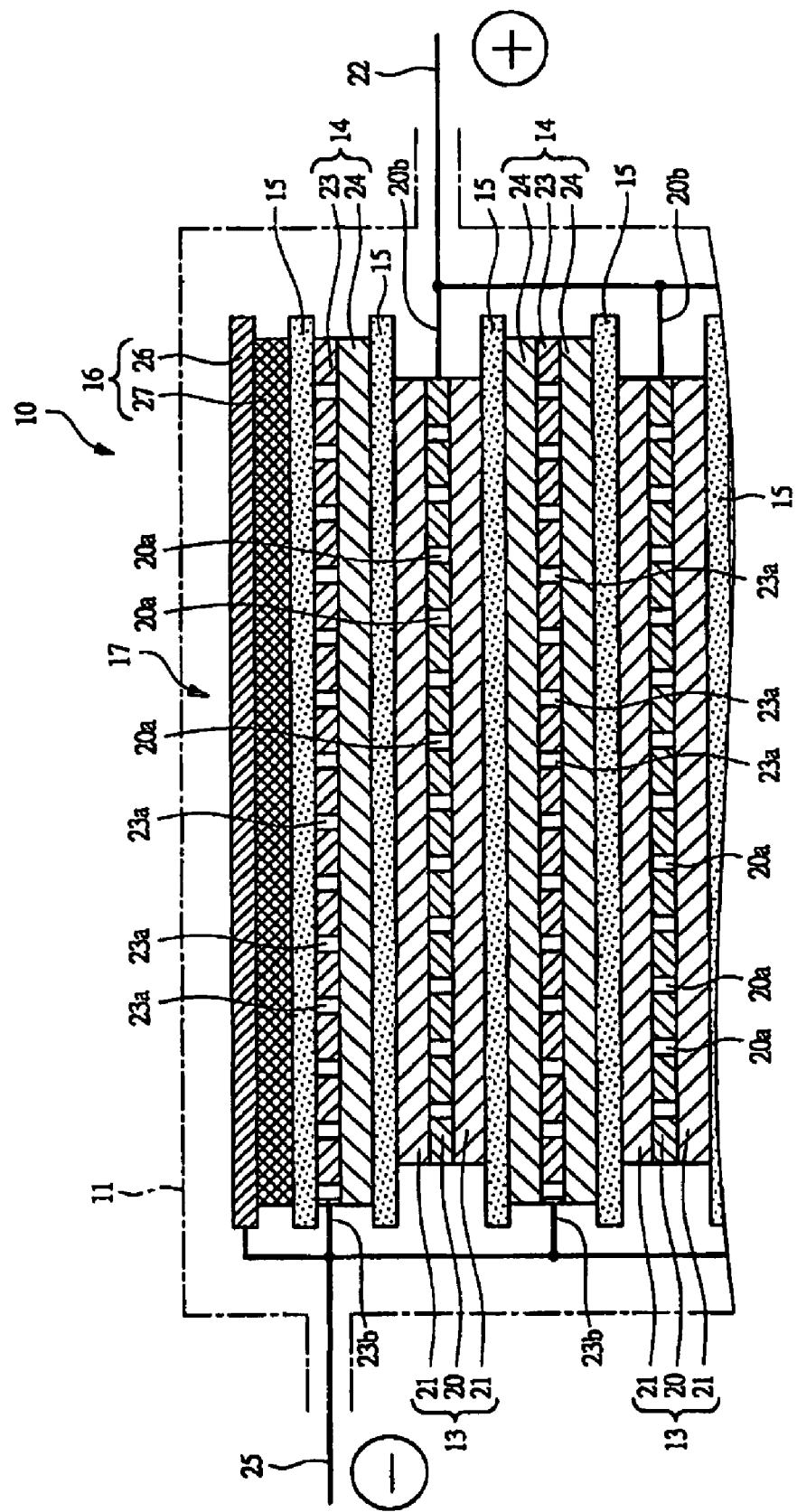
FIG. 3 is a sectional view showing the internal structure of the electric storage device as partially enlarged.

FIG. 3 is a sectional view partially showing the internal structure of the electric storage device 10 as enlarged. As shown in FIG. 3, each of the positive electrodes 13 has a positive electrode current collector (perforated current collector) 20 formed with a large number of through-holes 20a. A positive electrode mixture layer (electrode mixture layer) 21 is applied onto the positive electrode current collector 20. Terminal welding parts 20b extending in a convex fashion are provided to the positive electrode current collectors 20. Plural terminal welding parts 20b are bonded to each other as superimposed. A positive electrode terminal 22 is connected to the bonded terminal welding parts 20b. Similarly, each of the negative electrodes 14 has a negative electrode current collector (perforated current collector) 23 formed with a large number of through-holes 23a. A negative electrode mixture layer (electrode mixture layer) 24 is applied onto the negative electrode current collector 23. Terminal welding parts 23b extending in a convex fashion are provided to the negative electrode current collectors 23. Plural terminal welding parts 23b are bonded to each other as superimposed. A negative electrode terminal 25 is connected to the bonded terminal welding parts 23b.

The positive electrode mixture layer 21 contains an activated carbon as a positive electrode active material. The activated carbon allows lithium ions or anions to be reversibly doped thereinto and de-doped therefrom. The negative electrode mixture layer 24 contains a polyacene-based organic semiconductor (PAS) as a negative electrode active material. The PAS allows lithium ions to be reversibly doped thereinto and de-doped therefrom. Since the activated carbon is employed as the positive electrode active material and the PAS is employed as the negative electrode active material, the illustrated electric storage device 10 can function as a lithium ion capacitor. In the specification of the present invention, the term "doping (dope)" involves "occlude", "carry", "absorb" or "insert", and specifically a phenomenon where lithium ions or the like enter the positive electrode active material or the negative electrode active material. The term "de-doping (de-dope)" involves "release" and "desorb", and specifically a phenomenon where lithium ions or the like desorb from the positive electrode active material or the negative electrode active material.

As described above, the lithium electrode 16 is incorporated in the electric storage device 10. The lithium electrode 16 has a lithium electrode current collector 26 that is bonded to the negative electrode current collector 23. A metal lithium foil 27 serving as an ion source is press-fitted to the lithium electrode current collector 26. Therefore, the metal lithium foil 27 and the negative electrode mixture layer 24 are connected via the lithium electrode current collector 26 and the negative electrode current collector 23. Thus, the negative electrode 14 and the lithium electrode 16 are electrically connected. Accordingly, when the electrolyte solution is injected into the laminate film 11, the lithium ions are doped (hereinafter referred to as "pre-dope") into the negative electrode 14 from the lithium electrode 16.

The potential of the negative electrode can be lowered by pre-doping the lithium ions into the negative electrode 14 as described above. Accordingly, the cell voltage of the electric storage device 10 can be enhanced. The positive electrode 13 can deeply be discharged due to the lowering in the potential of the negative electrode, whereby the cell capacity (discharge capacity) of the electric storage device 10 can be enhanced. The electrostatic capacitance of the negative electrode 14 can be enhanced by pre-doping the lithium ions into the negative electrode 14. Accordingly, the electrostatic capacity of the electric storage device 10 can be enhanced. Since the cell voltage, the cell capacity, and the electrostatic capacity of the electric storage device 10 can be enhanced as described above, the energy density of the electric storage device 10 can be increased. From the viewpoint of increasing the capacity of the electric storage device 10, the amount of the metal lithium foil 27 is preferably set such that the potential of the positive electrode after the positive electrode 13 and the negative electrode 14 are short-circuited becomes 2.0 V (vs. Li/Li$^+$) or less.

The positive electrode current collectors 20 and the negative electrode current collectors 23 are provided with the through-holes 20$a$ and 23$a$. Therefore, the lithium ions emitted from the lithium electrode 16 can be moved in the laminating direction. Thus, the lithium ions can smoothly be pre-doped to all the laminated negative electrodes 14.

Figure 4:
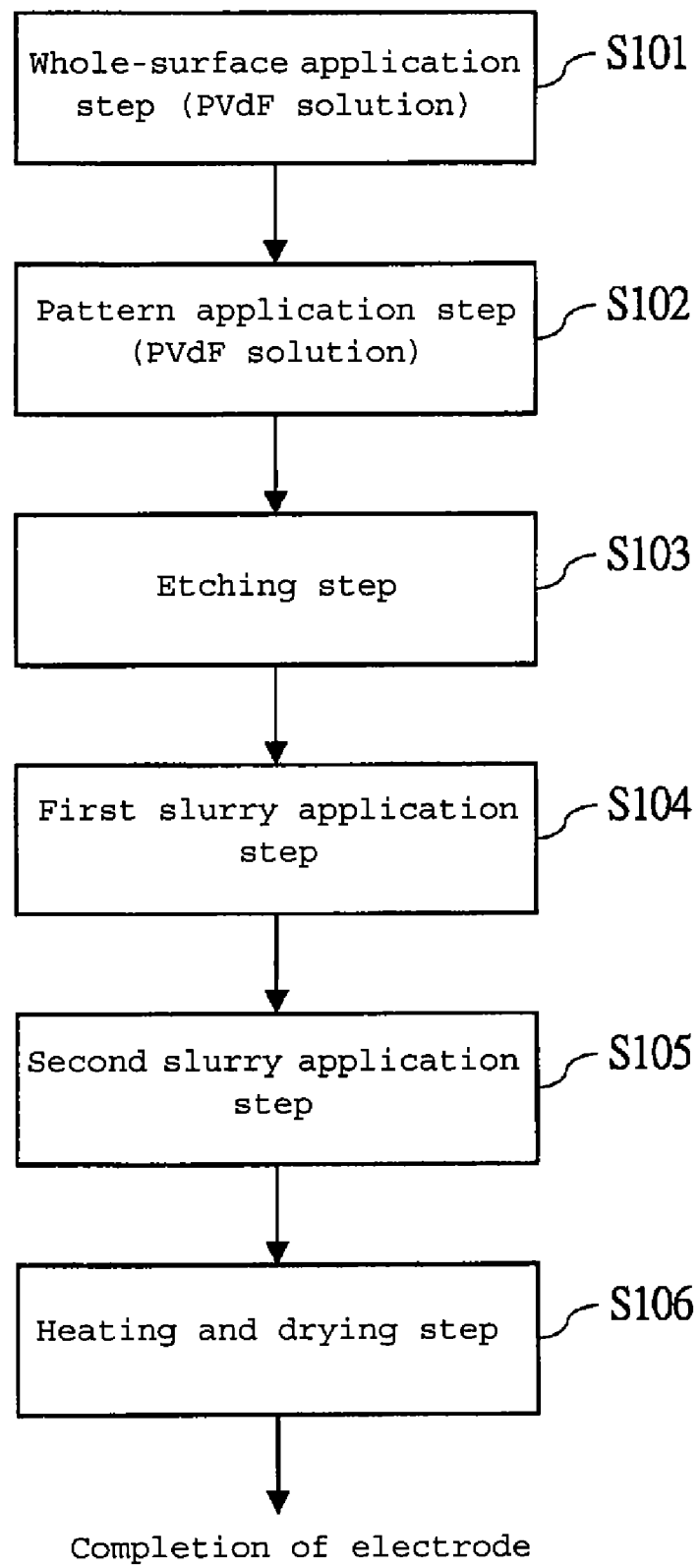
FIG. 4 is a flowchart showing a manufacturing process of an electrode according to one embodiment of the present invention.
Figure 5:
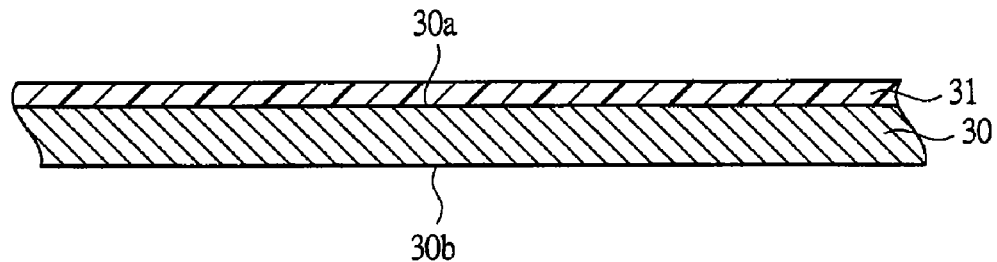
FIG. 5 is a schematic view showing an electrode state during each manufacturing step.
Figure 5:
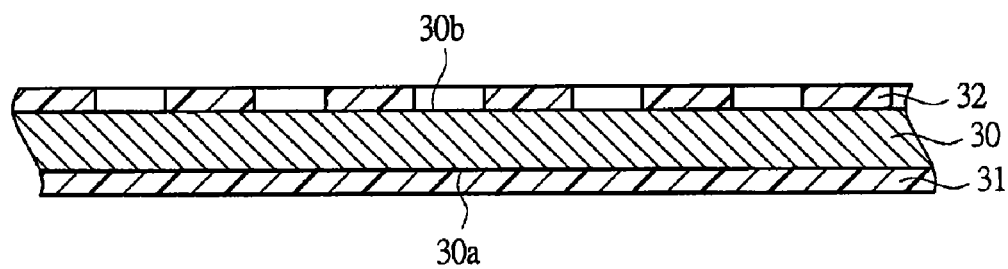
Figure 5:
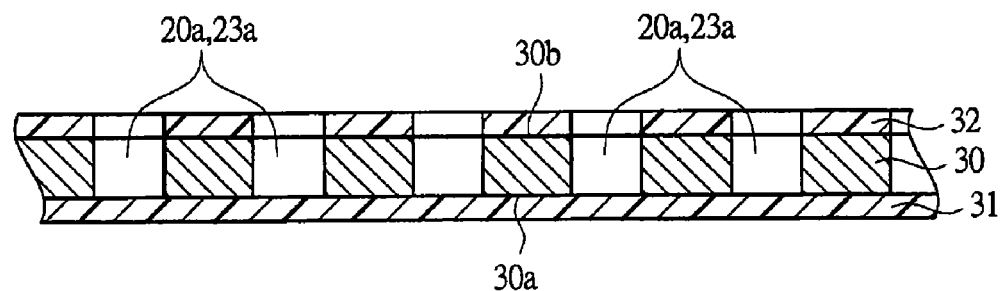
Figure 6:
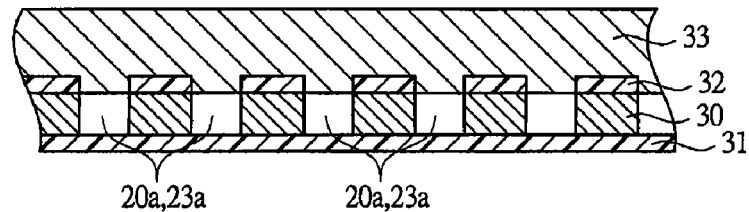
FIG. 6 is a schematic view showing an electrode state during each manufacturing step.
Figure 6:
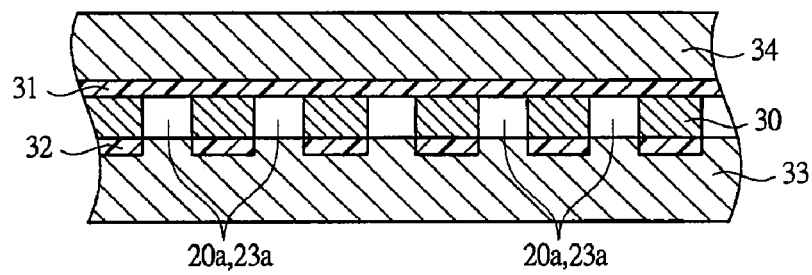
Figure 6:
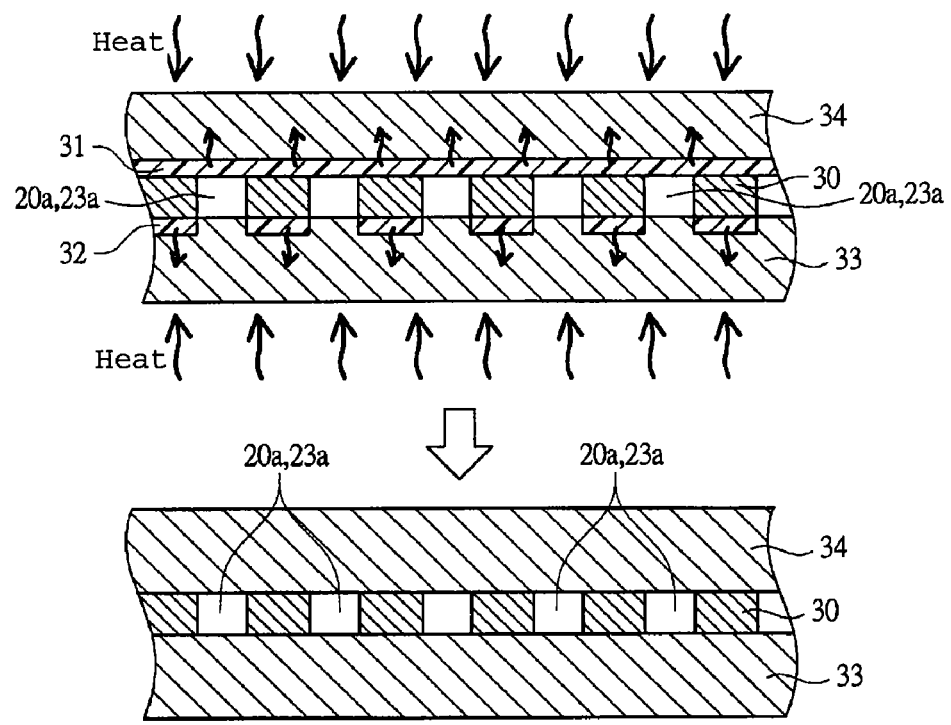

Subsequently, a manufacturing process of the positive electrode 13 and the negative electrode 14 will be explained. In the description of the manufacturing process, the positive electrode 13 and the negative electrode 14 are described as an electrode in order to explain the manufacturing process of the positive electrode 13 and the negative electrode 14 collectively. In the description of the manufacturing process below, the positive electrode mixture layer 21 and the negative electrode mixture layer 24 are described as an electrode mixture layer. FIG. 4 is a flowchart showing a manufacturing process of an electrode according to one embodiment of the present invention. FIGS. 5 and 6 are schematic views showing an electrode state during each of the manufacturing steps.

As shown in FIG. 4, a whole-surface application step (protection layer formation step) for forming a resist layer 31, serving as a protection layer, onto the current-collector material 30 is executed at step S101. In the whole-surface application step, a long-sized current-collector material 30 made of a metal foil is prepared as shown in FIG. 5A. A resist ink is applied onto the whole of one surface 30$a$ of the current-collector material 30. A resist layer 31 spreading all over one surface 30$a$ of the current-collector material 30 is formed by drying the resist ink. Then, at step S102, a pattern application step (protection layer formation step) for forming the resist layer 32, serving as the protection layer, onto the current-collector material 30 is executed. In the pattern formation step, a resist ink is applied with a predetermined pattern onto the other surface 30$b$ of the current-collector material 30 as shown in FIG. 5B. The resist layer 32 having a predetermined pattern corresponding to the through-holes 20$a$ and 23$a$ are formed on the other surface 30$b$ of the current-collector material 30 by drying the resist ink.

In the whole-surface application step and the pattern application step described above, the resist ink is applied with a gravure printing or screen printing. The resist ink is removed at the step executed later. Although almost all resist ink is removed from the current-collector surface in the step executed later, the resist ink moves to the interior of the electrode and remains therein. Therefore, the resist ink has to be the one that does not deteriorate the property of the electric storage device. For example, PVdF solution obtained by dissolving polyvinylidene fluoride (PVdF) into N-methyl-2-pyrolidone is employed. The resist layers 31 and 32 obtained by the PVdF solution has resistance to the later-described etching solution and the electrolyte solution used for the electric storage device. An aluminum foil is used, for example, as the current-collector material 30 for forming the positive electrode 13. On the other hand, a copper foil is used as the current-collector material 30 for forming the negative electrode 14.

As shown in FIG. 4, an etching step for forming the through-holes 20$a$ and 23$a$ in the current-collector material 30 is executed at the next step S103. In the etching step, the etching process is performed to the current-collector material 30 with the resist layers 31 and 32 used as a mask. Thus, a large number of through-holes 20$a$ and 23$a$ are formed on the current-collector material 30 from one surface. The etching solution used for the etching process is appropriately selected according to the type of the current-collector material 30. When the aluminum foil or copper foil is used as the current-collector material 30, hydrochloric acid or aqueous solution of ferric chloride can be used as the etching solution. Since the through-holes 20$a$ and 23$a$ are formed on the current-collector material 30 from one surface, the high-precise positioning of the resist layer 32 formed on the current-collector material 30 with a predetermined pattern is unnecessary as in the case of performing etching process from both the sides. Therefore, manufacturing cost of the positive electrode current collector 20 or the negative electrode current collector 23 can be lowered.

Figure 7:
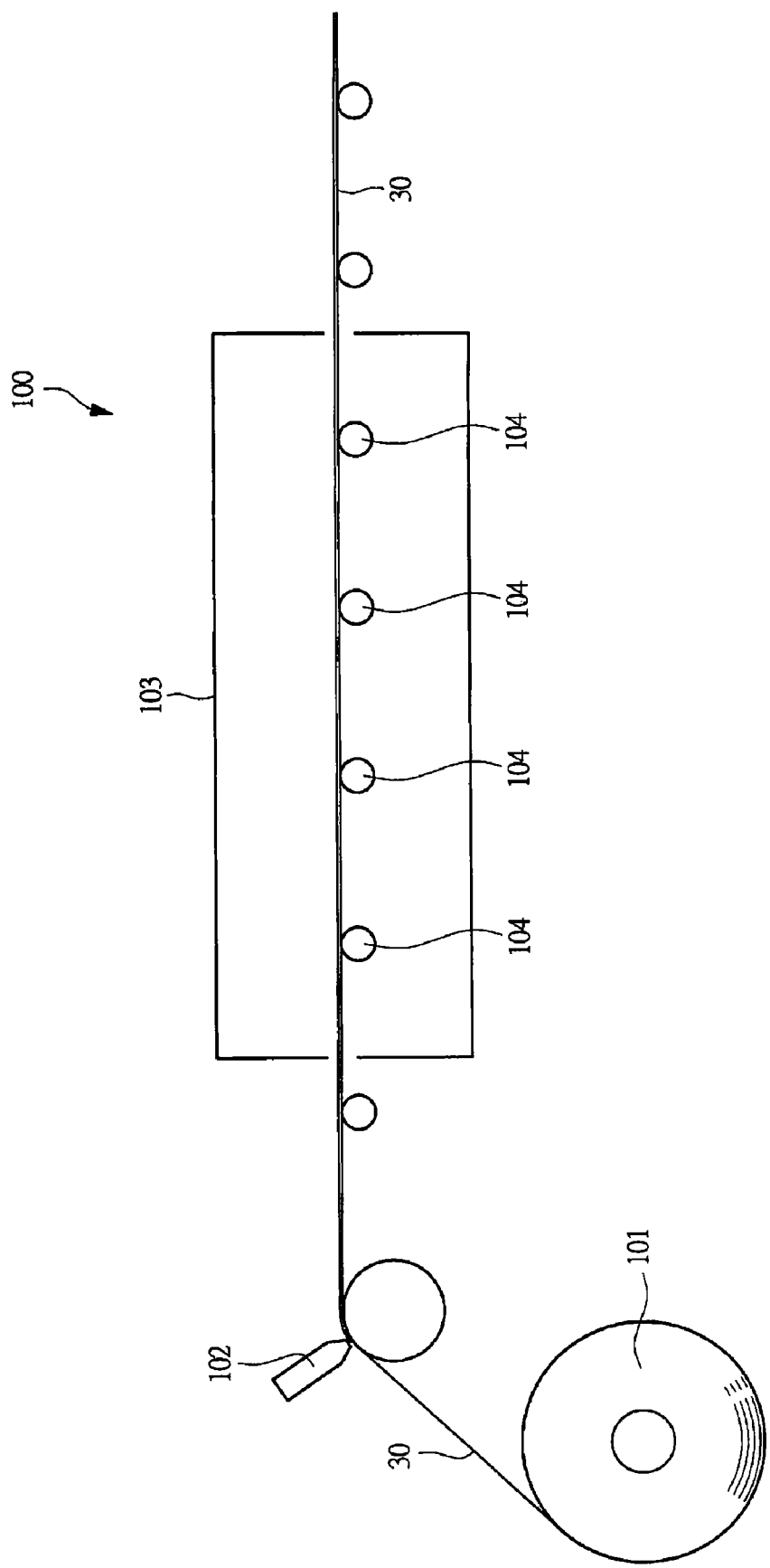
FIG. 7 is a schematic view showing one example of a coating/drying device.

As shown in FIG. 4, a first slurry application step (mixture layer formation step) for forming a first electrode mixture layer 33 on the current-collector material 30 formed with the through-holes 20$a$ and 23$a$ is executed at the next step S104. In the first slurry application step, an electrode slurry is applied onto the resist layer 32 left on the current-collector material 30 as shown in FIG. 6A. The electrode slurry can be applied so as to be filled in the through-holes 20$a$ and 23$a$. An electrode mixture layer 33 is formed on the resist layer 32 by drying the electrode slurry. FIG. 7 is a schematic view showing one example of a coating/drying device 100. As shown in FIG. 7, the current-collector material 30 having the resist layers 31 and 32 formed thereon and drawn from a roll 101 is guided to an application section 102 such as a die coater or the like. The electrode slurry is applied onto the current-collector material 30 at the application section 102. In order to dry the applied electrode slurry, the current-collector material 30 passes through a drying furnace 103 as being conveyed in the horizontal direction.

As described above, the electrode slurry is applied onto the current-collector material 30 without removing the resist layers 31 and 32 after the etching step. Specifically, the through-holes 20$a$ and 23$a$ on the current-collector material 30 having the electrode slurry applied thereon are closed by the resist layer 31. Therefore, even when the electrode slurry is applied onto the current-collector material 30, there is no chance that the electrode slurry passes through the through-holes 20$a$ and 23$a$ to reach the backside of the current-collector material 30. Accordingly, the electrode slurry is not deposited onto guide rollers 104 or the like of the coating/drying device 100, whereby the current-collector material 30 can be conveyed in the horizontal direction. Thus, the drying furnace 103 can be set longer compared to the application method in which the current-collector material 30 is lifted up in the vertical direction. Consequently, the conveying speed of the current-collector material 30 can be increased, whereby the productivity of the electrode can be enhanced.

The current-collector material 30 having the through-holes 20$a$ and 23$a$ has strength lower than the strength of a current-collector material having no through-holes. Therefore, it is difficult to increase the conveying speed of the current-collector material having the through-holes 20$a$ and 23$a$. On the other hand, the tensile strength of the current-collector material 30 during the application of the slurry can be increased by leaving the resist layers 31 and 32 on the current-collector material 30. Accordingly, the conveying speed of the current-collector material 30 can be increased, whereby the productivity of the electrode can be enhanced.

Next, as shown in FIG. 4, a second slurry application step (mixture layer formation step) for forming a second electrode mixture layer 34 on the current-collector material 30 is executed at step S105. In the second slurry application step, the electrode slurry is applied onto the remaining resist layer 31 of the current-collector material 30 as shown in FIG. 6B. The electrode mixture layer is formed on the resist layer 31 by drying the electrode slurry. In the second slurry application step, the resist layer 31 and the electrode mixture layer 33 that close the through-holes 20a and 23a are formed on the current-collector material 30. Therefore, there is no chance that the electrode slurry passes through the through-holes 20a and 23a to reach the backside of the current-collector material 30. Accordingly, the electrode mixture layer 34 is efficiently formed, while conveying the current-collector material 30 in the horizontal direction.

As shown in FIG. 4, a heating and drying step (protection layer removing step) is executed at the next step S106. In the heating and drying step, the current-collector material 30, having the electrode mixture layers 33 and 34 formed thereon, is heated and dried. In the heating and drying step, the current-collector material 30 having the electrode mixture layer is heated at a predetermined temperature (e.g., 150 to 200° C.) for a predetermined time (e.g., 12 hours) as shown in FIG. 6C. Thus, water contents remaining in the electrode mixture layers 33 and 34 are removed, and further the PVdF contained in the resist layers 31 and 32 is dissolved or decomposed. The dissolved PVdF is absorbed into the electrode mixture layers 33 and 34, and the resist layers 31 and 32 are removed from the current-collector material 30. The step of drying the electrode mixture layers 33 and 34 and the step of removing the resist layers 31 and 32 can be independently executed. Since the current-collector material 30 having the electrode mixture layers 33 and 34 formed thereon is heated at a temperature (150° C. or more) by which the PVdF is dissolved, the resist layers 31 and 32 are removed to lower the resistance of the electrode. The resist layers 31 and 32 can be removed through the heat treatment with a suitable temperature or more by which the PVdF is decomposed. The PVdF constituting the resist layers 31 and 32 is the material contained in the electrode slurry as a binder. Therefore, the resist layers 31 and 32 can be removed by the permeation of the PVdF into the electrode mixture layers 33 and 34. In the heating and drying step, the heating treatment is desirably performed under vacuum atmosphere or inert gas atmosphere in order to prevent the oxidization of the current-collector material 30 or the electrode mixture layers 33 and 34.

As described above, the electrode slurry is applied onto the current-collector material 30 on which the resist layer 31 for closing the through-holes 20a and 23a is formed. This structure prevents the applied electrode slurry from passing through the through-holes 20a and 23a to reach the backside of the current-collector material 30. Accordingly, the current-collector material 30 on which the electrode slurry is applied can be conveyed in the horizontal direction, whereby the productivity of the electrode can be enhanced. The formation of the resist layers 31 and 32 can increase the tensile strength of the current-collector material 30. Accordingly, the conveying speed of the current-collector material 30 in the application of the slurry can be increased, whereby the productivity of the electrode can be enhanced. Since the leakage of the electrode slurry can be prevented, the through-holes 20a and 23a can be formed to be large. Therefore, the productivity of the electric storage device 10 can be enhanced without lowering the pre-doping speed of the lithium ions.

Since the resist layers 31 and 32 are removed in the heating and drying step, the resistance of the electrode can be decreased. Accordingly, the characteristic of the electric storage device 10 having the electrode incorporated therein can be enhanced. Since the resist layers 31 and 32 are dissolved to be removed in the heating and drying step in which the water contents are removed to complete the electrode mixture layers 33 and 34, the resist layers 31 and 32 can be removed at low cost.

In the aforesaid description, the temperature of the drying furnace 103 is set to the temperature by which the PVdF is dissolved or higher so as to remove the resist layers 31 and 32 immediately after the electrode slurry is applied. In this case, it is important to set various conditions, such as the conveying speed, in order to prevent the break of the current-collector material 30 or quality degradation of the electrode mixture layers 33 and 34 caused by the temperature rise. The present invention is not limited to the above-mentioned step. A heating and drying step, different from the drying step by the drying furnace 103 of the coating/drying device 100, can be provided.

In the heating and drying step, the resist layers 31 and 32 between the current-collector material 30 and the electrode mixture layers 33 and 34 are removed, so that a gap is likely to be formed between the current-collector material 30 and the electrode mixture layers 33 and 34 depending on the conditions. In this case, a pressing process can be performed to the electrode after the heating and drying step. In the above-mentioned description, the long-sized current-collector material 30 provided with the electrode mixture layers 33 and 34 is subject to the heating and drying step. However, the invention is not limited thereto. For example, the current-collector material 30 having the electrode mixture layers 33 and 34 can be cut into a predetermined size, and then, the cut current-collector material 30 can be subject to the heating and drying step.

The components of the aforesaid electric storage device will be explained in detail in the order described below: [A] positive electrode, [B] negative electrode, [C] positive electrode current collector and negative electrode current collector, [D] lithium electrode, [E] separator, [F] electrolyte solution, [G] outer casing.

[A] Positive Electrode

The positive electrode has the positive-electrode current collector and the positive electrode mixture layer applied on the positive electrode current collector. When the electric storage device functions as a lithium ion capacitor, a material that allows lithium ions and/or anions to be reversibly doped and de-doped can be employed as a positive electrode active material contained in the positive electrode mixture layer. Specifically, the positive electrode active material is not particularly limited, so long as it allows at least one of lithium ion or anion to be reversibly doped and de-doped. Examples of the positive-electrode active materials include activated carbon, transition metal oxide, conductive polymer, polyacene-based substance, etc.

For example, the activated carbon is made of an activated carbon grain that is subject to an alkali activation treatment and has a specific surface area of not less than 600 $m^2/g$. A phenolic resin, petroleum pitch, petroleum coke, coconut husk, coal-derived coke, etc. are used as the material of the activated carbon, wherein it is preferable to use the phenolic resin or coal-derived coke, since they can increase the specific surface area. Preferable alkali activators used for the alkali activation treatment of the activated carbons include salts or hydroxides of a metal ion such as lithium, sodium, potassium, etc., wherein potassium hydroxide is more preferable. Examples of the methods of the alkali activation include the method in which a carbide and an activator are mixed, and then, the resultant is heated in an airflow of inert gas, the method in which an activator is carried on a raw material of an activated carbon beforehand, the resultant is heated, and then, a carbonizing process and activating process are performed, the method in which a carbide is activated with a gas activation by using water vapors, and then, the resultant is surface-treated with an alkali activator. The activated carbon to which the alkali activation treatment is performed is pulverized by a known pulverizer such as a ball mill or the like. A wide range of the grain size generally used can be applied. For example, it is preferable that $D_{50}$ is 2 μm or more, more preferably 2 to 50 μm, and most preferably 2 to 20 μm. Further, the activated carbon preferably having an average pore diameter of 10 nm or less and a specific surface area of 600 to 3000 $m^2/g$ is preferable. An activated carbon having a specific surface area of 800 $m^2/g$ or more, particularly 1300 to 2500 $m^2/g$ is more preferable.

When the electric storage device functions as a lithium ion battery, a conductive polymer such as polyanine or a material that allows lithium ions to be reversibly doped or de-doped can be employed as the positive electrode active material contained in the positive electrode mixture layer. For example, vanadium pentoxide ($V_2O_5$) or lithium cobalt oxide ($LiCoO_2$) can be used as the positive electrode active material. Examples of the other materials include a lithium-containing metal oxide represented by a chemical formula of $Li_xM_yO_z$ (x, y, z are positive numbers, M is a metal, or can be metals of two or more types), such as $Li_xCoO_2$, $Li_xNiO_2$, $Li_xMnO_2$, $Li_xFeO_2$, etc., or a transition metal oxide such as cobalt, manganese, vanadium, titanium, nickel, etc, or a transition metal sulfide such as cobalt, manganese, vanadium, titanium, nickel, etc. In case of requiring a high voltage, a lithium-containing oxide having a potential of 4 V or more with respect to the metal lithium is preferably used. More preferable lithium-containing oxides include a lithium-containing cobalt oxide, lithium-containing nickel oxide, or lithium-containing cobalt-nickel compound oxide.

The positive electrode active material described above is formed into a powdery shape, granular shape, short fibrous shape, etc., and this positive electrode active material is mixed with a binder to form an electrode slurry. The electrode slurry containing the positive electrode active material is applied on the positive electrode current collector and the resultant is dried, whereby the positive electrode mixture layer is formed on the positive electrode current collector. Usable binders mixed with the positive electrode active material include rubber binder such as SBR, fluorine-containing resin such as polytetrafluoroethylene, polyvinylidene fluoride, etc., thermoplastic resin such as polypropylene, polyethylene, polyacrylate, etc. A conductive material such as acetylene black, graphite, metal powder, etc. can appropriately be added to the positive electrode mixture layer.

[B] Negative Electrode

The negative electrode has the negative electrode current collector and the negative electrode mixture layer applied on the negative electrode current collector. The negative electrode mixture layer contains a negative electrode active material. The negative electrode active material is not particularly limited, so long as it allows lithium ions to be reversibly doped and de-doped. Examples of the negative-electrode active material include graphite, various carbon materials such as hard carbon (non-graphitizable carbon), and polyacene-based material, tin oxide, silicon oxide, etc. The graphite and hard carbon material are preferable as the negative-electrode active material, since they can increase the capacity. Further, a polyacene-based organic semiconductor (PAS) that is a heat-treated material of an aromatic condensation polymer is preferable for a negative-electrode active material, since it can increase the capacity. The PAS has a polyacene skeletal structure. The ratio (H/C) of a number of hydrogen atoms to a number of carbon atoms is preferably within the range of not less than 0.05 and not more than 0.50. When the H/C of the PAS exceeds 0.50, the aromatic polycyclic structure is not sufficiently grown, so that the lithium ions cannot smoothly be doped or de-doped. Therefore, the charging/discharging efficiency of the electric storage device might be lowered. When the H/C of the PAS is less than 0.05, the capacity of the electric storage device might be lowered.

The aforesaid negative-electrode active material such as PAS is formed into a powdery shape, a granular shape or short fibrous shape. This negative electrode active material is mixed with a binder to form an electrode slurry. The electrode slurry containing the negative electrode active material is applied on the negative electrode current collector and the resultant is dried, whereby the negative electrode mixture layer is formed on the negative electrode current collector. Usable binders mixed with the negative electrode active material include fluorine-containing resin such as polytetrafluoroethylene, polyvinylidene fluoride, etc., thermoplastic resin such as polypropylene, polyethylene, polyacrylate, etc, and a rubber binder such as styrene butadiene rubber (SBR), etc. The fluorine-based binder is preferably used. Examples of the fluorine-based binder include polyvinylidene fluoride, copolymer of vinylidene fluoride and trifluoroethylene, copolymer of ethylene and tetrafluoroethylene, copolymer of propylene and tetrafluoroethylene, etc. A conductive material such as acetylene black, graphite, metal powder, etc. can appropriately be added to the negative-electrode mixture layer.

[C] Positive Electrode Current Collector and Negative Electrode Current Collector Various materials generally proposed for a battery or a capacitor can be employed as the material of the negative electrode current collector and the positive electrode current collector. For example, aluminum, stainless steel or the like can be used as the material of the positive electrode current collector. Stainless steel, copper, nickel, etc. can be used as the material of the negative electrode current collector. The aperture ratio of the through-holes formed on the positive electrode current collector and the negative electrode current collector is not particularly limited, but it is preferably set to 40 to 60%. The shape and number of the through-hole are not particularly limited, and they are appropriately set so long as they do not hinder the movement of the lithium ions. The shape of the through-holes formed on the positive electrode current collector and the negative electrode current collector can have any shapes, such as circle, ellipse, rectangle, diamond, slit-like shape, or the like.

[D] Lithium Electrode

Various materials generally proposed as a current collector of a battery or a capacitor can be used as the material of the lithium-electrode current collector. Examples of these materials include a stainless steel, copper, nickel, or the like. The lithium-electrode current collector can have through-holes penetrating therethrough, such as an expanded metal, punching metal, etching foil, net, expanded member, etc. Instead of the metal lithium foil adhered onto the lithium electrode current collector, lithium-aluminum alloy, which can emit lithium ions, can be used.

[E] Separator

A porous member or the like having durability with respect to the electrolyte solution, positive-electrode active material, negative-electrode active material, or the like, having an open cell and having no electron conductivity can be used for the separator. Generally, a cloth, nonwoven fabric, or porous body made of paper (cellulose), glass fiber, polyethylene, polypropylene, etc. is used. The thickness of the separator may appropriately be set considering the holding amount of the electrolyte solution, strength of the separator, or the like. The thickness of the separator is preferably thin in order to reduce the internal resistance of the electric storage device.

[F] Electrolyte Solution

It is preferable that an aprotic organic solvent containing a lithium salt is used for the electrolyte solution from the viewpoint that an electrolysis is not generated even by a high voltage and lithium ions can stably be present. Examples of the aprotic organic solvent include ethylene carbonate, propylene carbonate, dimethyl carbonate, diethyl carbonate, γ-butyloractone, acetonitrile, dimethoxyethane, tetrahydrofuran, dioxolane, methylene chloride, sulfolane, etc., wherein these material are used singly or mixed with one another. Examples of the lithium salt include $LiClO_4$, $LiAsF_6$, $LiBF_4$, $LiPF_6$, $LiN(C_2F_5SO_2)_2$, etc. Further, the concentration of the electrolyte in the electrolyte solution is preferably set to at least 0.1 mol/L or more, and more preferably set within the range of 0.5 to 1.5 mol/L, in order to lower the internal resistance due to the electrolyte solution.

Ionic liquid can be employed instead of the organic solvent. The combination of various cations and anions is proposed as the ionic liquid. Examples of the cations include N-methyl-N-propylpiperidinium (PP13), 1-ethyl-3-methyl-imidazolium (EMI), diethyl-methyl-2-methoxyethyl-ammonium (DEME), etc. Examples of the anions include bis(fluorosulfonyl)-imide (FSI), bis(trifluoromethanesulfonyl)-imide (TFSI), $PF_6^-$, $BF_4^-$, etc.

[G] Outer Casing

Various materials generally used for a battery can be used for the outer casing. A metal material such as iron or aluminum can be used, and a film material or the like made of resin can be used. The shape of the outer casing is not particularly limited. The outer casing can be formed into a shape appropriately selected according to the purpose, such as a cylindrical shape or rectangular shape. From the viewpoint of miniaturization or decrease in weight of the electric storage device, it is preferable to use the film-type outer casing employing an aluminum laminate film. In general, a three-layered laminate film having a nylon film at the outer part, an aluminum foil at the middle part, and an adhesive layer such as a denatured polypropylene at the inner part is used.

The present invention is not limited to the aforesaid embodiments, and various modifications are possible without departing from the scope of the present invention. For example, the electrode obtained by the manufacturing process of the present invention can be applied not only to the lithium ion battery or lithium ion capacitor but also to various types of batteries or capacitors.

In the aforesaid description, the pattern application step is performed after the whole-surface application step. However, the present invention is not limited thereto. For example, the whole-surface application step can be performed after the pattern application step. Alternatively, the whole-surface application step and the pattern application step can simultaneously be performed. In the whole-surface application step and, the pattern application step, the PVdF solution is applied by a gravure printing, and then, the PVdF solution is dried to form a film, thereby forming the resist layers 31 and 32. However, the present invention is not limited thereto. For example, the resist layers can be formed by using ultraviolet curing type resist ink or heat curing type resist ink, if it has a resistance to the etching solution or electrolyte solution. Further, the resist layers can be formed by using a photoresist that forms the resist layers through an exposure process and a developing process, if it has a resistance to the etching solution or electrolyte solution.

What is claimed is:

1. A manufacturing process of an electrode provided with a perforated current collector, comprising:

a protection layer formation step in which a protection layer spreading on one surface of a current-collector material is formed while a protection layer having a predetermined pattern is formed on the other surface of the current-collector material;

an etching step for performing an etching process on the current-collector material from the surface on which the protection layer having the predetermined pattern is formed so as to form through-holes on the current-collector material;

a mixture layer formation step in which an electrode slurry is applied onto the current-collector material having the protection layers and the through-holes so as to form an electrode mixture layer; and a heat treatment step in which the current-collector material having the mixture layer in the mixture layer formation step is heated at 150° C. to 200° C., wherein the protection layers are formed by using polyvinyldiene fluoride solution consisting only of polyvinyldiene fluoride as a solute.

2. A manufacturing process of an electrode according to claim 1, wherein the protection layer spreading on one surface of the current-collector material prevents the electrode slurry from leaking from the through-holes in the mixture layer formation step.

* * * * *